United States Patent
Oetiker (12)

(10) Patent No.: US 6,421,886 B1
(45) Date of Patent: Jul. 23, 2002

(54) ARRANGEMENT FOR CONNECTING THE EDGES OF TWO STRIPS, FOR INSTANCE OF A LOCKING RING OR BAND

(75) Inventor: Hans Oetiker, Horgen (CH)

(73) Assignee: Hans Oetiker AG, Horgen (CH)

(*) Notice: Subject to any disclaimer, the term of this patent is extended or adjusted under 35 U.S.C. 154(b) by 0 days.

(21) Appl. No.: 09/601,430
(22) PCT Filed: Dec. 9, 1998
(86) PCT No.: PCT/CH98/00521
§ 371 (c)(1),
(2), (4) Date: Sep. 27, 2000
(87) PCT Pub. No.: WO99/39123
PCT Pub. Date: Aug. 5, 1999

(30) Foreign Application Priority Data

Feb. 2, 1998 (CH) ................................. 240/98

(51) Int. Cl.⁷ ........................ B65D 63/02; F16B 2/08; F16B 5/08
(52) U.S. Cl. ...................... 24/23 R; 24/20 EE; 24/20 R
(58) Field of Search .................... 24/20 R, 23 W, 24/20 EE, 20 CW, 20 TT, 279, 23 EE, 23 R, 21, 22

(56) References Cited

U.S. PATENT DOCUMENTS

| 343,645 A | * | 6/1886 | Meyer et al. ........... 24/20 EE X |
| 1,199,595 A | * | 9/1916 | Noble ........................ 24/20 EE |
| 2,035,351 A | * | 3/1936 | Taylor ........................ 24/20 EE |
| 4,442,154 A | * | 4/1984 | Förtsch et al. ........... 24/20 R X |
| 5,001,816 A | | 3/1991 | Oetiker |
| 5,150,503 A | | 9/1992 | Müller |

FOREIGN PATENT DOCUMENTS

| DE | 1 750 297 | 2/1971 |
| DE | 40 21 746 C2 | 1/1993 |
| EP | 0 543 338 A1 | 8/1995 |
| EP | 0 802 333 A1 | 12/1997 |
| GB | 1 405 293 | 9/1975 |

* cited by examiner

Primary Examiner—Robert J. Sandy
(74) Attorney, Agent, or Firm—Pearne & Gordon LLP

(57) ABSTRACT

Based on a system for joining two end edges as described in the German patent 40 09 259, an improved system to join the strip edges of a clamping ring or a compression ring, said junction of the invention withstanding higher tensile loads. Compared to the system described in the German patent 40 09 259, the junction comprises a tenon (21) fitted with two lateral stubs (23, 25, 27, 29) mutually apart in the longitude strip direction and engaging around matching mortises in the other strip segment (5).

18 Claims, 4 Drawing Sheets

ARRANGEMENT FOR CONNECTING THE EDGES OF TWO STRIPS, FOR INSTANCE OF A LOCKING RING OR BAND

The present invention relates to an arrangement, hereafter system, as defined in the preamble of claim 1, to a clamp or pipe clamp with such a system, and to a compression ring or shrink ring comprising such a system.

When clamping tubular elements on a corresponding peripheral zone of a cylindrical structure such as a shaft or another pipe, so-called clamping ring known per se are used.

Such clamping rings fitted with so-called ears are known in practice but inappropriate in some cases. In particular, lack of space may preclude accommodating the ears.

In such instances so-called clamping or compression rings have been found practical: these are externally shrunk-on or compressed, or else they stretch the cylindrical structure to press the two pipes against each other.

Such clamps and compression rings are manufactured by sawing, stamping or cutting annular segments from or out of pipes of appropriate diameters. Such manufacture however incurs drawbacks because:

(a) the newly made pipes must be deburred at the outer longitudinal ring sides, i.e., a further processing stage is required, (b) only non-oxidizing materials can be used, not—for instance—galvanized pipes, the rings being damaged at the longitudinal sides, in other words galvanizing is lacking there, and (c) only one ring size can be manufactured from the pipe diameter.

Another manufacturing procedure consists in "everting" the so-called support washers, substantial forces being required and the large inner stresses being present in the ring. Once a ring's size is given, rings of arbitrary diameters cannot be made.

Another way might be to manufacture a ring from an appropriate strip segment cut out of an endless belt, namely by bending the segment in circular manner. However it was found that the connection of the two ends of the segment are a weak point and in particular cannot withstand tension or butting.

Figure 1:
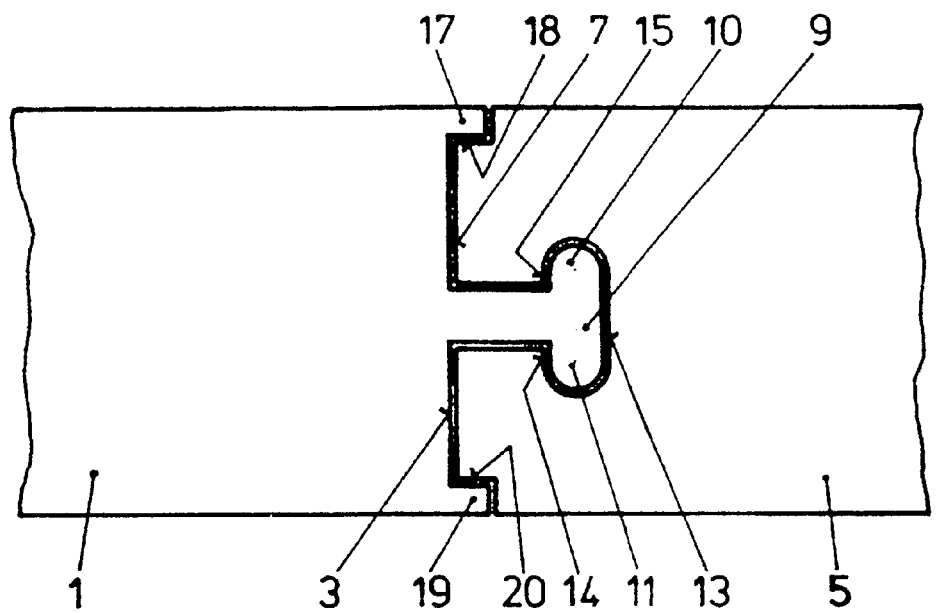

The German patent 40 09 259 discloses a system connecting two terminal strip segment edges in order to make a clamp or a so-called shrink ring which in particular can withstand tensile and compressive stresses. This junction may be improved further in that laser spot welds are used along the junction line of the mutually engaging segments, or by using-swaged segments. Such a junction, disclosed in said German patent 40 09 259, is shown in FIG. 1. However, where comparatively narrow strips, or shrink rings, are involved, especially if made of aluminum, it was found such a junction allows only a small load, i.e. it will rupture at high tension.

Accordingly it is an objective of the present invention and based on a junction of two terminal strip edges as shown in the German patent document 40 09 259 to propose a junction withstanding higher tensile loads. The invention solves this problem by a system defined in claim 1.

The invention proposes that similarly to the case of the German patent 40 09 259, one terminal edge, or one strip segment, shall comprise a roughly tenon-shaped projection, hereafter called the tenon, which runs in the longitudinal strip direction, said tenon engaging a clearance, hereafter called the mortise, in the other strip segment, said tenon running substantially perpendicularly to the first strip segment's edge, namely in the belt's longitudinal direction and comprising at least two stubs mutually apart in the direction of the tenon, i.e. in the strip's longitudinal direction and which, in the direction of the edge, i.e. in the transverse strip direction, each engage around a zone in the other strip segment.

Preferably the tenon comprises at least two stubs spaced apart in the strip's longitudinal direction engaging around, and at each side of the said tenon, the other belt segment, i.e. resting in the mortise of the other belt segment so as to geometrically interlock with it.

In one embodiment variation, at least some of the stubs laterally projecting from the tenon and engaging around the other strip segment are designed in such a way comprises an offset running oppositely the strip's longitudinal direction in one strip segment.

Further preferred embodiment variations of the system of the invention are stated in the dependent claims 2 through 12.

The system defined in the invention is especially applicable to manufacturing a clamp, i.e. to connect and to produce a pipe clamp, in particular a so-called clamping ring or a shrink ring.

The invention is illustratively elucidated below in relation to the attached drawings.

Figure 2:
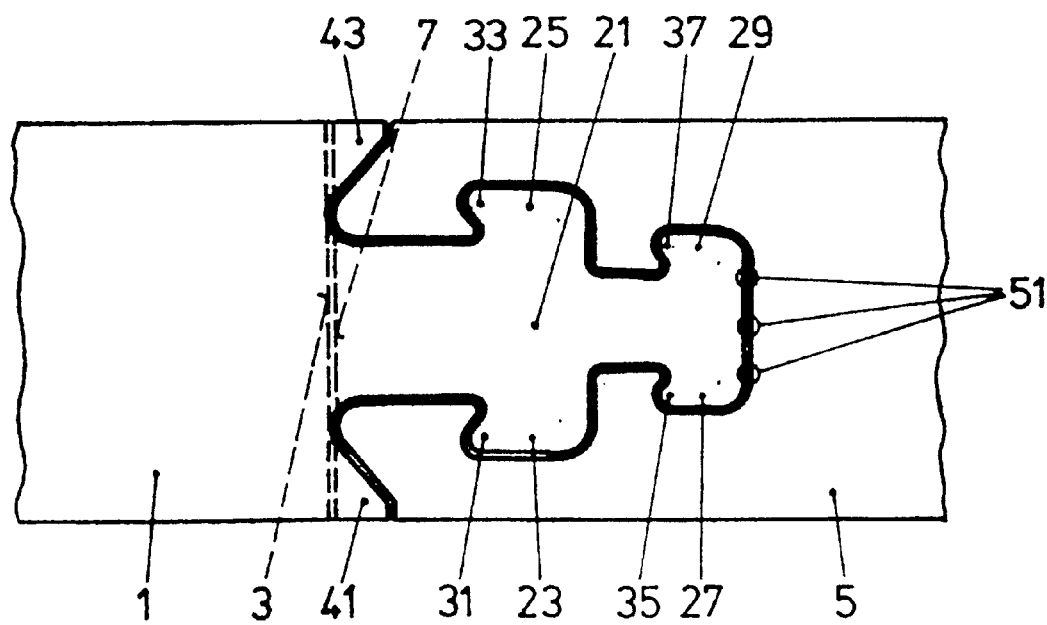
Figure 3:
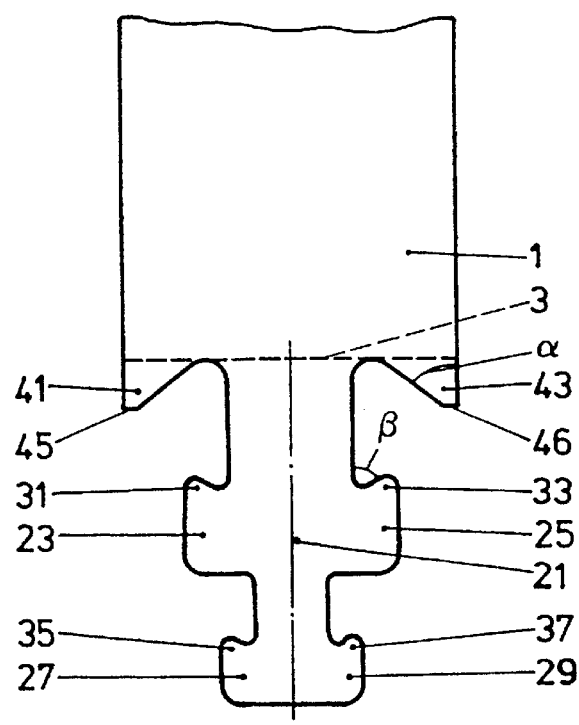
Figure 3:
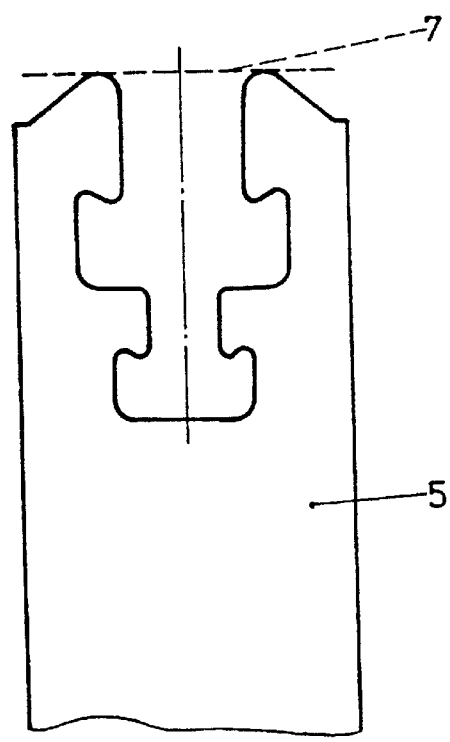
Figure 4:
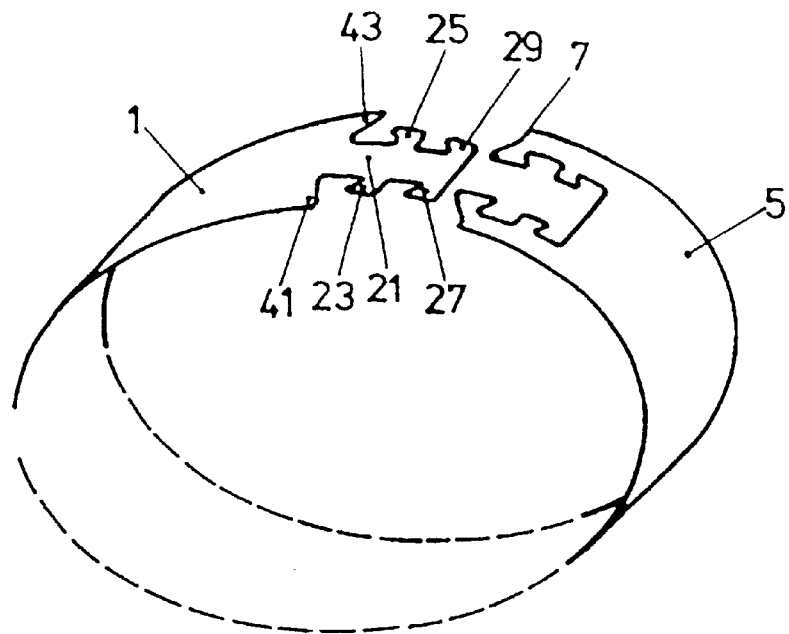
Figure 5:
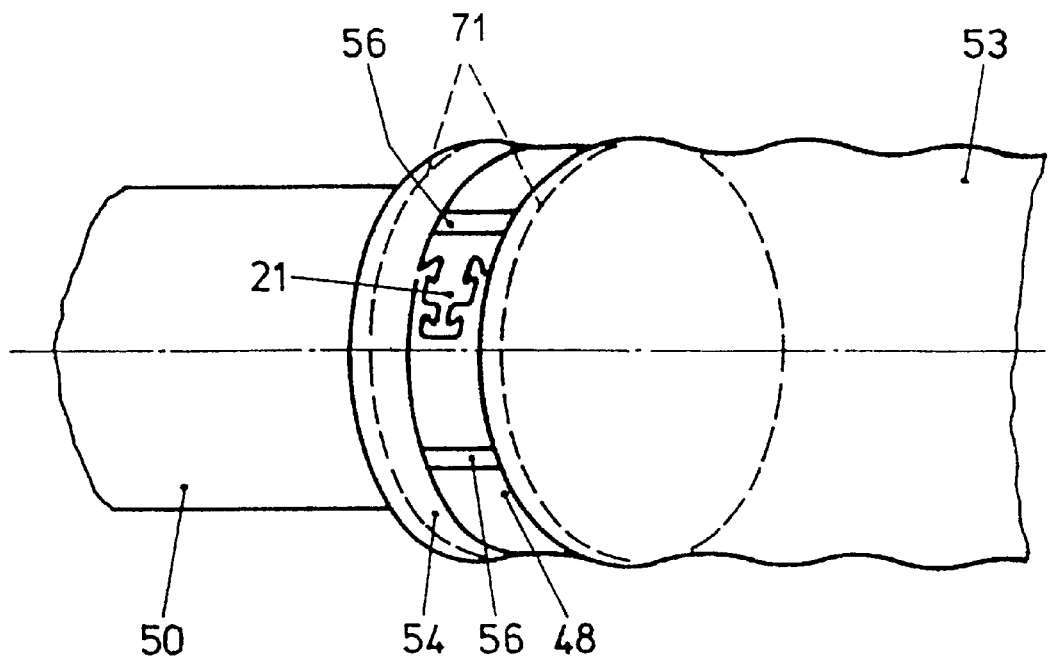
Figure 6A:
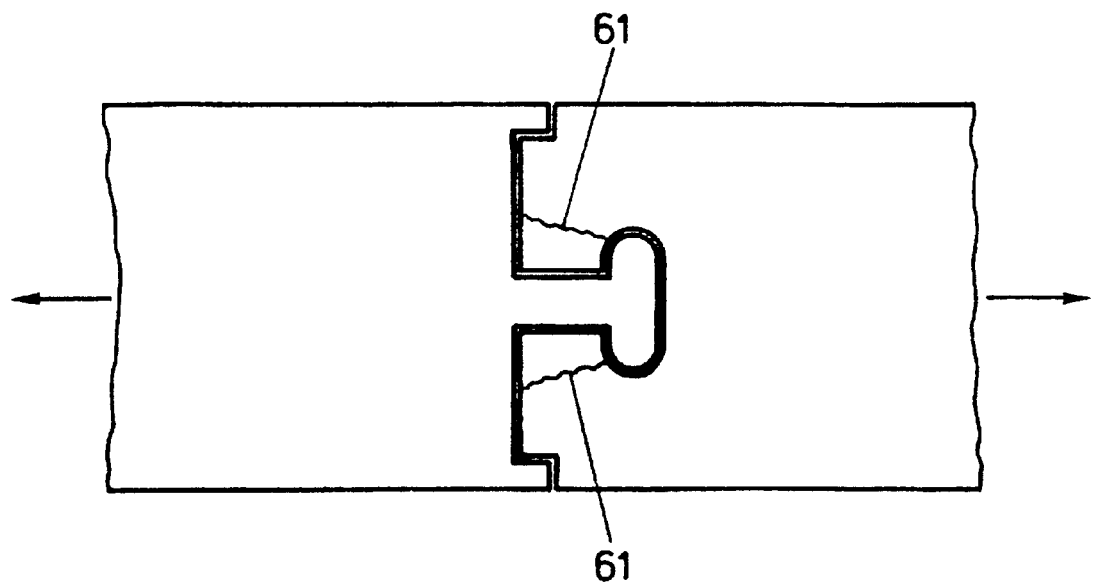
Figure 6B:
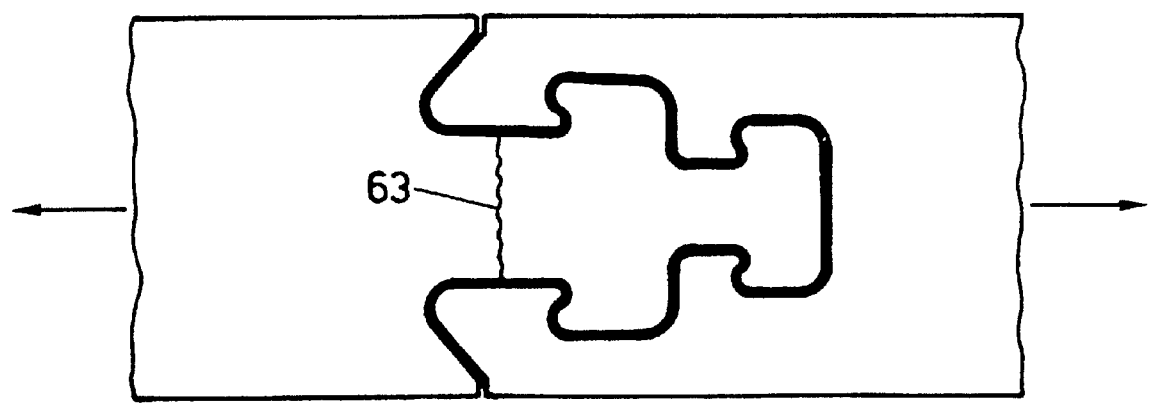

FIG. 1 shows a junction of two terminal strip edges disclosed in the German patent 40 09 259, in other words as known from the state of the art, FIG. 2 shows a system of the invention to join two terminal strip edges, FIG. 3 shows the system of FIG. 2 in exploded form, FIG. 4 shows a clamping ring, i.e. a pipe clamp, comprising a system of the invention, in the disconnected, opened state, FIG. 5 shows the connection of a shaft to a bellows-like pipe, i.e. a flexi-tube, when using a clamp of the invention, namely a compression ring, and FIGS. 6*a*, 6*b* are outlines of a system of the state of the art and of a system of the invention under tensile stress.

FIG. 1 shows an embodiment of a junction of two terminal strip edges which is known from the state of the art, for instance being appropriate for a pipe clamp. The two terminal strip segments 1 and 5 are joined to each other along their common edges 3 and 7. A retention element, i.e. a protrusion, namely a tenon 9 is present at the edge 3 and comprises laterally projecting stubs. The protrusion, i.e. the tenon 9 comprises two such stubs 10 and 11, said tenon jointly with two such stubs engaging coinciding, unreferenced clearances, i.e. a mortise in the strip segment 5. By means of two stubs 10 and 11 the tenon 9 engages along the corresponding mortise in the edge direction along both zones 14 and 15.

If now the junction of FIG. 1 is tensively or compressively loaded, the zones of the strip segment 5 configured behind the zones 14 and 15 tend to move laterally away from the tenon 9 which as a result may be pulled or pushed out of the corresponding mortise. To counteract this bias toward lateral shearing by both these zones, the two protrusions 17 and 19 are configured at one edge, namely edge 3. These two protrusions 17 and 19 rest against the elements 18 and 20 of the flat strip segment 5 and in this manner counteract lateral shearing of the two zones behind the elements 18 and 20, resp. the zones 14 and 15.

Additionally, laser weld spots may be put in place along the junction lines, i.e. the edges 3 and 7, in order to enhance the junction quality. Moreover the edge may be swaged to improve this junction.

As already cited above, it was found in practice however that junctions such as shown in FIG. 1 and known from the German patent 40 09 259 no longer withstand modern high loads as regards narrow strips made of aluminum and that on occasion the tenon 9 may be torn out of the strip segment 5.

For that reason the invention presently shall propose a junction of two strip segments as shown in FIG. 2. Again the two strip segments 1 and 5 for instance of a pipe clamp must be joined, the conceptual junction edges 3 and 7 being shown by dashed lines. Again a retaining element, i.e. a protrusion, namely a tenon 21 projects from the junction edge 3 into the other strip segment 7 to engage it, though in this design the tenon comprises several longitudinally spaced stubs engaging around certain zones in the other strip segment. FIG. 2 clearly shows the stubs 23, 25, 27 and 29 laterally projecting from the tenon 21 and engaging geometrically coinciding clearances constituting the mortise, of which the elements are unreferenced again for simplicity, situated in the other strip segment 5. It was found advantageous that said laterally projecting stubs include additionally "rearward directed" zones or offsets 31, 33, 35 and 37 that run backwards with respect to the tenon's direction, namely resp. toward the conceptual edges 3 and 7.

Similarly to the two additional protrusions 17 and 19 of FIG. 1, the design of FIG. 2 comprises at the side of the longitudinal strip edges another protrusion 41 and 43 resp. which in this instance however and at least along a portion of the junction of the two edges runs obliquely to said strip's longitudinal edges. Basically however the functions of the two additional protrusions 41 and 43 are the same as the two protrusions 17 and 19 in the junction system of FIG. 1.

FIG. 3 shows the junction means of FIG. 2 when taken apart. It clearly shows that the lateral stubs 23, 25, 27 and 29 comprise rearward-pointing zones, or offsets 31, 33, 35 and 37. It was found advantageous that the rearward-pointing boundary line of said offsets subtend an angle β in the range from 50° to 70°, preferably 60°, with the strip's longitudinal direction, i.e. the longitudinal direction of the tenon 21. Advantageously again, the width of the tenon 21 between the first strip segment and the two first laterally projecting stubs 23 and 25 is larger than the width between the first laterally projecting stubs 23 and 25 and the two terminal, laterally projecting stubs 27 and 29.

As regards the two further, laterally projecting protrusions 41 and 43 in the vicinity of the strip's longitudinal edges, the oblique boundary line preferably shall subtend an angle a in the range between about 40° to 60°, preferably 50°, with the strip's longitudinal direction. Moreover, near each longitudinal edge of the first strip segment 1 and the second strip segment 5, a flat is provided to prevent that the two protrusions 41 and 43 terminate in sharp points. Such sharp points might break off and also might hurt personnel.

Lastly FIG. 3 clearly shows that nearly all corner zones along the effective terminal edge of the strip segment 1 or along the second strip segment 5 are rounded off along the full contour of the tenon 21, again to preclude forming sharp tips, both to preclude breaking off and hurting personnel.

FIG. 4 shows a clamp or clamp ring of the invention, consisting of a clamping strip with two terminal ends 1 and 5. The clamping ring is shown in the open, unjoined state. The clamping strip may be an integral or a multi-element component fitted with one or more junction elements of the invention.

The two terminal edges at the terminal strip segments 1 and 5 are fitted with junction elements similarly to the embodiments of FIGS. 2 and 3. The tenon 21 comprising bilaterally projecting stubs 23, 25, 27 and 29 is configured at the strip segment 1. A matching mortise is configured in the other strip segment 5.

The further protrusions 41 and 43 are configured on the sides of the tenon 21 and again are designed to engage in corresponding clearances in the other strip segment.

Depending on the desired diameter of the clamping or compression ring, a commensurate strip segment may be cut off an endless belt. The tenon 21 together with the further two protrusions 41 and 43 are jointly stamped out of the terminal segment 1 and the corresponding mortise and clearances are jointly stamped out of the opposite strip segment 5. The clamping ring is assembled by bringing together the two terminal strip segments 1 and 5 and by bending these strip segments and joining them. As already mentioned above and as shown being terminally situated and denoted by 51 in FIG. 2, swaging or crimping sites may be used, for instance employing laser welding or swaging, in order to complete the junction.

FIG. 5 shows a clamp of the invention or a compression ring of FIG. 4 in the joined, closed state to elucidate an actual application. A shaft 50 comprises a terminal zone 51 of a diameter larger than that of the shaft 50. A flexi-tube 53 of which the terminal segment 54 is slipped over the zone 51 must be joined firmly to the shaft 50. Illustratively such a junction is required in the automotive industry where wheel axles, drive and universal shafts are protected by concertina walls or enclosed by them. In this design too the rubber bellows or the concertina wall is affixed to a mating part, for instance the shaft.

After the flexi-tube 53 with its part 54 is slipped over the zone 51, the clamping ring also is slipped on said zone 54. Again a tenon 21 moves into a corresponding mortise and the lateral other stubs rest against the matching elements of the opposite segment of the clamping strip, i.e. the compression ring 48. In order that two strip ends be joined in fixed manner to each other, the junction again may comprise swaging or crimping sites or laser-weld spots as already mentioned in relation to FIG. 4.

After the clamping or compression ring 48 has been mounted on the slipped-on zone 54, appropriate tools such as clamping jaws (omitted) are mounted around the clamping ring which is compressed on this zone 54 in order to compress said jaws. The diameter of the clamping ring is reduced by this compression and compression zones 56 are generated at the clamping ring 48. The flexi-tube 53 now is firmly affixed to the shaft 50. Obviously too this connection can be implemented by replacing the compression with radial expansion of the inner zone 51, whereby, finally, the clamping ring shall externally clamp the flexi-tube on the slipped-on zone 54 onto the inner zone 51.

The procedure elucidated in relation to FIG. 5 also can be used in joining an arbitrary number of corrugated ands tubular elements by means of a clamping or compression ring.

FIGS. 6a and 6b each show the line along which a junction of the state of the art and a junction of the invention shall rupture when high loads are applied. FIG. 6a shows a junction system disclosed in the German patent 40 09 259 as indicated by FIG. 1, the tensile load in the direction of the arrow rupturing the connection along the line 61.

On the other hand the tensile load applied in the direction of the arrow in FIG. 6b to a junction of the invention will cause rupture along the line 63 and, keeping constant the width, thickness and the material of said strip, tearing occurs only at a tensile load which is higher by about 30 to 40%. This higher tensile strength is significant, especially with respect to using aluminum and very narrow compression rings or pipe clamps. However such higher tensile strength also is offered by other materials such as the stainless or galvanized steel, other metal alloys or by reinforced plastics.

Obviously the junction systems shown in FIGS. 2 through 6 merely are illustrative embodiments which may be arbitrarily amended, modified or complemented. It is quite clearly feasible as well to replace the shown, single tenon by several such, each of which is fitted in the longitudinal, i.e. the tenon direction, with spaced lateral stubs. Also more than two transverse elements may be configured per tenon in the longitudinal strip direction, and moreover not all lateral stubs need be fitted with rearward-pointing protrusions. The tenon width also may be varied or be made to match the strip width.

In principle all the tenon configurations described in the German patent 40 09 259 may be applied to the present junction, except that at least one tenon be fitted with at least two lateral stubs spaced apart in the longitudinal strip direction.

What is claimed is:

1. A system to join terminal strip edges of two strip segments, the terminal edge of one strip segment comprising at least one tenon (21) engaging a matching mortise in the other strip segment (5), the tenon (21) running substantially in a strip direction into the other strip segment (5) and comprising at least two stubs (23, 25, 27, 29) which are mutually spaced apart in a longitudinal strip direction, each of said stubs laterally project from the tenon transversely to the longitudinal strip direction and engage around a zone in the other strip segment (5), wherein, in a vicinity of each of two longitudinal strip edges of the one strip segment in the vicinity of the junction, the terminal edge (3) comprises a protrusion (41, 43) running toward the other strip segment (5).

2. The system as claimed in claim 1, wherein the two stubs comprise at least two stubs (23, 25, 27, 29) on each of two opposing sides of the tenon and both mutually spaced apart in the longitudinal strip direction and wherein said tenon geometrically interlocks inside the matching mortise of the other strip segment (5).

3. The system as claimed in claim 1, wherein at least some of the stubs (23, 25, 27, 29) laterally projecting from the tenon (21) and engaging around the other strip segment (5) comprises an offset (31, 33, 35, 37) running backward relative to the strip direction of the one strip segment (1).

4. The system as claimed in claim 3, wherein the offsets (31, 33, 35, 37) comprise a boundary line running obliquely to the longitudinal strip direction, and toward the one strip segment.

5. The system as claimed in claim 4, wherein the boundary line of each offset (31, 33, 35, 37) subtends all angle (β) of about 50 to 70° with the longitudinal direction.

6. The system as claimed in claim 1, wherein tie tenon (21) is wider between the one strip segment (1) and the fist laterally projecting stub (23, 25) than between the first and second laterally projecting stubs (27, 29).

7. The system as claimed in claim 1, wherein the protrusion (41, 43) extends obliquely toward the strip's longitudinal edge.

8. The system as claimed in claim 7, wherein a boundary line of the protrusion (41, 43) as seen from the one strip segment (1) subtends an angle (α) of about 40 to 60° with the strip's longitudinal edge.

9. The system as claimed in claim 1, wherein at least two of the tenons (21) project in the longitudinal strip direction from the one strip serpent into the other.

10. The system as claimed in claim 1, wherein said at least one tenon and the matching mortise in the strip segments (1, 5) comprise rounded edges.

11. The system as claimed in claim 1, wherein junction sites (51) are provided along a junction line between the strip segments (1, 5).

12. A clamp or a clamping ring or a shrink ring fitted with a system as claimed in claim 1.

13. The system as claimed in claim 1, wherein the protrusion has a projecting end spaced from the tenon.

14. The system as claimed in claim 13, wherein the protrusion extends obliquely toward the strip's longitudinal edge.

15. The system as claimed in claim 13, wherein the projecting end comprises a rounded edge.

16. The system as claimed in claim 1, wherein the protrusion extends obliquely from the terminal edge to the strip's longitudinal edge.

17. The system as claimed in claim 1, wherein the protrusion comprises rounded edges.

18. The system as claimed in claim 1, wherein a full contour of the tenon is rounded to preclude sharp edges.

* * * * *

UNITED STATES PATENT AND TRADEMARK OFFICE
CERTIFICATE OF CORRECTION

PATENT NO. : 6,421,886 B1
DATED : July 23, 2002
INVENTOR(S) : Hans Oetiker

It is certified that error appears in the above-identified patent and that said Letters Patent is hereby corrected as shown below:

<u>Column 4,</u>
Line 18, please delete "51", and insert therefor -- 71 --.
Line 20, please delete "51", and insert therefor -- 71 --.
Line 28, please delete "51", and insert therefor -- 71 --.
Line 45, please delete "51", and insert therefor -- 71 --.
Line 46, please delete "flexi-tube", and insert therefor -- flexitube --.

<u>Column 6,</u>
Line 4, please delete "tie", and insert therefor -- the --.
Line 5, please delete "fist", and insert therefor -- first --.

Signed and Sealed this

Twenty-sixth Day of November, 2002

*Attest:*

JAMES E. ROGAN
*Attesting Officer*   *Director of the United States Patent and Trademark Office*